(12) United States Patent
Park et al.

(10) Patent No.: US 11,356,646 B1
(45) Date of Patent: Jun. 7, 2022

(54) DEVICE FOR PROJECTING IMAGE ON SURFACE OF OBJECT

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Goo Man Park, Seoul (KR); Sang Joon Kim, Seoul (KR); Yu Jin Lee, Seoul (KR)

(73) Assignee: FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/162,216

(22) Filed: Jan. 29, 2021

(30) Foreign Application Priority Data

Dec. 1, 2020 (KR) .................. 10-2020-0165703

(51) Int. Cl.
*G06T 7/90* (2017.01)
*G06T 7/50* (2017.01)
*G06T 3/00* (2006.01)
*H04N 9/31* (2006.01)
*G06T 7/00* (2017.01)

(52) U.S. Cl.
CPC ........... *H04N 9/3185* (2013.01); *G06T 3/005* (2013.01); *G06T 7/0002* (2013.01); *G06T 7/50* (2017.01); *G06T 7/90* (2017.01); *G06T 2207/30168* (2013.01)

(58) Field of Classification Search
CPC .............. G06T 7/50; G06T 7/90; G06T 3/005
See application file for complete search history.

(56) References Cited

U.S. PATENT DOCUMENTS

| 6,516,099 B1 * | 2/2003 | Davison .................... G06T 7/33 348/42 |
| 7,199,793 B2 * | 4/2007 | Oh ......................... G06T 15/205 345/422 |
| 7,787,659 B2 * | 8/2010 | Schultz ................. G06T 11/203 356/3 |
| 8,768,046 B2 * | 7/2014 | Ernst ......................... G06T 7/80 382/154 |

(Continued)

FOREIGN PATENT DOCUMENTS

| KR | 1020150000911 | 1/2015 |
| KR | 1020160084502 | 7/2016 |

(Continued)

*Primary Examiner* — Brian P Yenke
(74) *Attorney, Agent, or Firm* — Hamre, Schumann, Mueller & Larson, P.C.

(57) ABSTRACT

A device for projecting an image on a surface of an object includes an extracting unit configured to extract information about a plurality of lines from an image of the object based on depth information and color information extracted from the image of the object; an image projection distortion information deriving unit configured to derive image projection distortion information about the surface of the object based on the information about the plurality of lines; and a projecting unit configured to project a content image on the surface of the object based on the derived image projection distortion information.

4 Claims, 4 Drawing Sheets

(56) References Cited

U.S. PATENT DOCUMENTS

| | | | | |
|---|---|---|---|---|
| 10,083,522 B2* | 9/2018 | Jovanovic | | G06T 5/006 |
| 10,176,564 B1* | 1/2019 | El Dokor | | G06T 7/11 |
| 10,656,506 B2* | 5/2020 | Fuchikami | | H04N 5/74 |
| 10,846,844 B1* | 11/2020 | El Dokor | | G06T 7/593 |
| 11,158,074 B1* | 10/2021 | Kantor | | G06T 7/521 |
| 2009/0073324 A1* | 3/2009 | Tan | | H04N 9/3185 |
| | | | | 348/745 |
| 2009/0207185 A1* | 8/2009 | Furui | | H04N 9/3194 |
| | | | | 353/69 |
| 2010/0046801 A1* | 2/2010 | Ishiyama | | G01C 3/08 |
| | | | | 382/106 |
| 2010/0289817 A1* | 11/2010 | Meier | | G06T 15/20 |
| | | | | 345/619 |
| 2011/0053688 A1* | 3/2011 | Crawford | | A63D 5/04 |
| | | | | 463/31 |
| 2011/0254832 A1* | 10/2011 | Wilson | | G10H 1/36 |
| | | | | 345/418 |
| 2012/0163656 A1* | 6/2012 | Wang | | G06V 20/10 |
| | | | | 382/103 |
| 2015/0310604 A1* | 10/2015 | Lim | | G06T 7/001 |
| | | | | 382/141 |
| 2016/0284048 A1* | 9/2016 | Rekimoto | | H04N 5/23238 |
| 2016/0335778 A1* | 11/2016 | Smits | | G06T 7/20 |
| 2016/0371855 A1* | 12/2016 | Jovanovic | | G06T 7/74 |
| 2017/0064294 A1* | 3/2017 | Priede | | G06T 15/04 |
| 2018/0211410 A1* | 7/2018 | Taylor | | G06V 20/582 |
| 2020/0197772 A1* | 6/2020 | Browning, Jr. | | A63B 71/0622 |
| 2021/0142547 A1* | 5/2021 | Fessler, Jr | | A63F 13/63 |

FOREIGN PATENT DOCUMENTS

| | | |
|---|---|---|
| KR | 101896183 B1 | 9/2018 |
| KR | 1020190118317 | 10/2019 |

\* cited by examiner

DEVICE FOR PROJECTING IMAGE ON SURFACE OF OBJECT

CROSS-REFERENCE TO RELATED APPLICATION

This application claims the benefit under 35 USC 119(a) of Korean Patent Application No. 10-2020-0165703 filed on 1 Dec. 2020, in the Korean Intellectual Property Office, the entire disclosures of which are incorporated herein by reference for all purposes.

TECHNICAL FIELD

The present disclosure relates to a device for projecting an image on the surface of an object.

BACKGROUND

A wall or screen projection method using a projector has been widely used in various fields such as art, performance, education and the like.

In recent years, as low-priced projectors such as mini projectors have become widespread, the use of projectors in exhibition and performance art spaces as well as at homes has increased, and a new exhibition method such as Media Facade Art has appeared. Here, Media Facade Art is a compound word of "Media" and "Façade", meaning an external wall of a building and is one of the methods for projecting various content images on external walls of a building.

Conventional projection mapping methods may include a method for projecting a content image on a wall surface or a fixed three-dimensional surface and a method for projecting a content image on the surface of a moving object.

As shown in FIG. 1A, there is a technique of projection mapping on the surface of a moving object (ball or clothes). However, when content is projected on the surface of a moving object in a limited space, the shape or movement pattern of the object needs to be uniform.

Also, the conventional projection mapping method can be performed only when the placement of an object on which a content image is to be projected is fixed. FIG. 1B illustrates content images projected on the surfaces of objects whose placement is fixed.

SUMMARY

The technologies described and recited herein include a method of projection mapping that is automatically matched with the surface of an object while the surface of the object changes frequently.

The problems to be solved by the present disclosure are not limited to the above-described problems. There may be other problems to be solved by the present disclosure.

According to an exemplary embodiment, an image projecting device for projecting an image on a surface of an object may include an extracting unit configured to extract information about a plurality of lines from an image of the object based on depth information and color information extracted from the image of the object; an image projection distortion information deriving unit configured to derive image projection distortion information about the surface of the object based on the information about the plurality of lines; and a projecting unit configured to project a content image on the surface of the object based on the derived image projection distortion information The above-described embodiments are provided by way of illustration only and should not be construed as liming the present disclosure. Besides the above-described embodiments, there may be additional embodiments described in the accompanying drawings and the detailed description.

According to any one of the above-described embodiments of the present disclosure, it is possible to provide a method of projection mapping that is automatically matched with the surface of an object while the surface of the object changes frequently.

Therefore, according to the present disclosure, regardless of the placement of a plurality of cubes included in an object and the shape of the plurality of cubes, it is possible to recognize the surface of the object including the plurality of cubes and project a content image on the surface of the object. Also, even when the user frequently changes a stack form of the object, it is possible to project an interactive content image on the changed object. Therefore, according to the present disclosure, there is no need to specify a projection mapped content image or fix the placement of the object in advance. Further, the present disclosure allows for freedom from limitations in the space to be projected and the surface of an object.

Furthermore, according to the present disclosure, regardless of the position of the user, it is possible to project a content image on the surface of an object from the point of view of the user looking at the object.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1A:
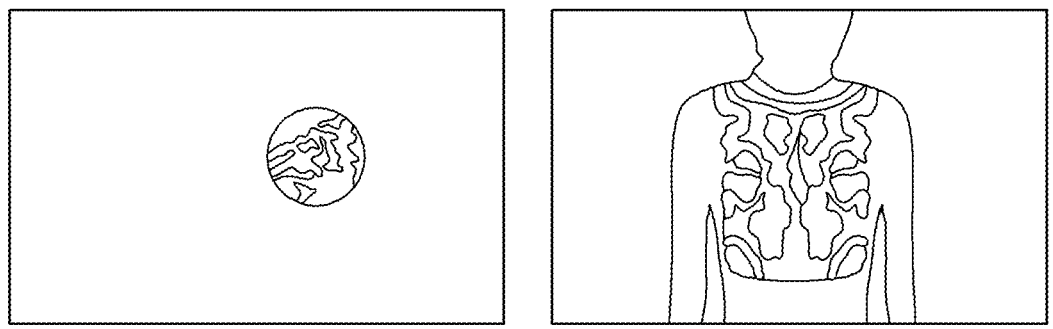
FIG. 1A is example depictions to explain a conventional projection mapping method.
Figure 1B:
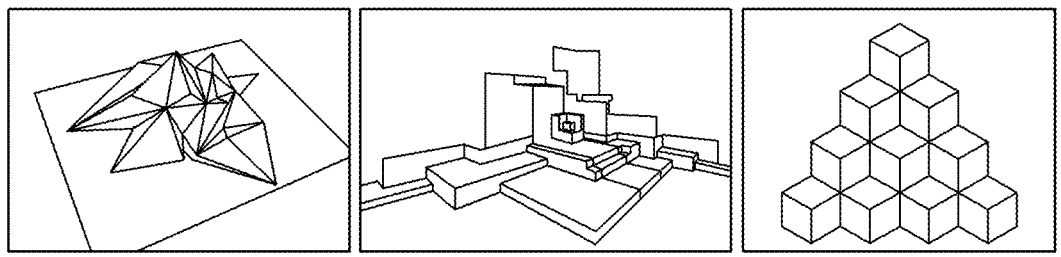
FIG. 1B is example depictions to explain a conventional projection mapping method.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereinafter, embodiments of the present disclosure will be explained in detail with reference to the accompanying configuration diagram or flowchart.

Figure 2:
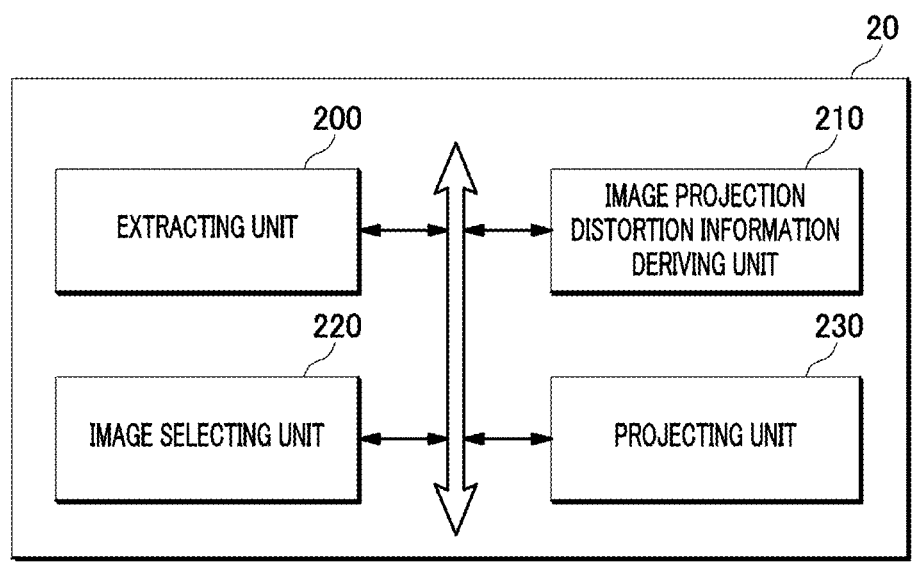
FIG. 2 is a block diagram illustrating an image projecting device, in accordance with various embodiments described herein.

FIG. 2 is a block diagram illustrating an image projecting device 20, in accordance with various embodiments described herein.

Referring to FIG. 2, the image projecting device 20 may include an extracting unit 200, an image projection distortion information deriving unit 210, an image selecting unit 220 and a projecting unit 230. However, the image projecting device 20 depicted in FIG. 2 is just an embodiment of the present disclosure and can be modified in various ways based on its components depicted in FIG. 2.

Figure 3:
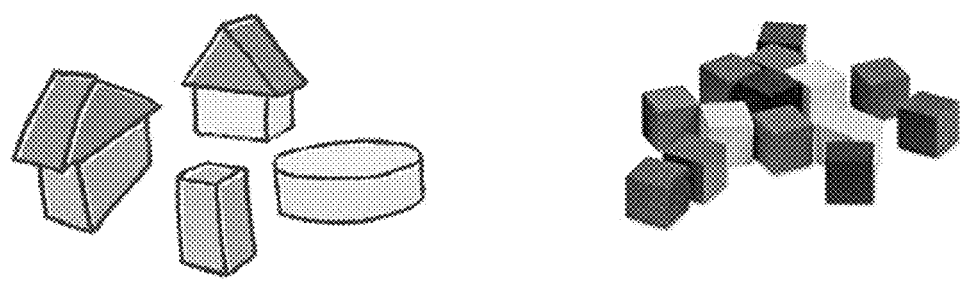
FIG. 3 is a depiction illustrating a plurality of objects which is placed randomly, in accordance with various embodiments described herein.

A receiving unit (not shown) may receive an image of an object from an imaging device (not shown) that has imaged the object. Here, the imaging device (not shown) may be a depth sensing camera (for example, a ToF camera, two or more RGB cameras, a laser scanner, a Kinect camera, etc.). Here, the object may include a plurality of cubes (polyhedrons) in various shapes. The image of the object may be taken, for example, when the plurality of cubes is placed randomly. For example, referring to FIG. 3, the image of the object may be taken when the plurality of randomly placed cubes is scattered or stacked. Here, the placement of the plurality of cubes is not fixed, but changes frequently.

For example, the receiving unit (not shown) may receive an image of the object including a plurality of cubes whose placement changes frequently from the imaging device (not shown). The image of the object may include, for example, an object depth image, a point cloud, a left and right stereo RGB image and the like.

The extracting unit 200 may extract depth information and color information about the object from the image of the object.

Also, the extracting unit 200 may extract depth information and color information about the object from an image of the object which is taken whenever the placement of the object (the placement of the plurality of cubes included in the object) changes.

For example, the extracting unit 200 may recognize the apparent edges and the surfaces of the plurality of randomly placed cubes from the image of the object.

For example, the extracting unit 200 may extract depth information about the object from the image of the object by using a SLAM algorithm, or may extract depth information about the object from the image of the object by using a specific coordinate system (for example, Epipolar Geometry) for describing binocular disparity information.

For example, the extracting unit 200 may extract color information about the object from the image of the object by using a left and right stereo RGB image included in the image of the object.

The extracting unit 200 may extract plane information about the object based on the extracted depth information and color information about the object.

Also, the extracting unit 200 may extract information (for example, plane information, straight line information or curve information) about a plurality of lines from the image of the object based on the extracted depth information and color information about the object. For example, the extracting unit 200 may extract plane information and line information (for example, straight line or curve) about the plurality of cubes included in the object from the image of the object by using the Hough transform method or an edge detection operator.

For example, the extracting unit 200 may extract at least one line information of the plurality of cubes included in the object from the image of the object by using a three-dimensional object stack decoding algorithm. Here, the three-dimensional object stack decoding algorithm refers to an algorithm for deriving line information of a plurality of cubes from an image of a three-dimensional object by using a sensing signal related to depth information about the three-dimensional object received from a depth sensing camera.

The image projection distortion information deriving unit 210 may derive image projection distortion information about the surface of the object based on the extracted information the plurality of lines.

For example, the image projection distortion information deriving unit 210 may calculate a vanishing point and a perspective value of the object by using three-dimensional perspective transformation and derive image projection distortion information about the surface of the object based on the calculated vanishing point and perspective value.

The image projection distortion information deriving unit 210 may identify information of the direction in which a distance between at least two lines among the plurality of lines narrows and derive image projection distortion information about the surface of the object based on the identified direction information. For example, the image projection distortion information deriving unit 210 may recognize the direction in which a distance between at least two lines among the plurality of lines extracted by using the three-dimensional object stack decoding algorithm narrows as a longitudinal direction and the direction in which a distance between at least two lines among the plurality of lines does not narrow as a horizontal direction.

The image projection distortion information deriving unit 210 may calculate the number of pixels regarding the plurality of lines, calculate a distance ratio of a first distance between the at least two lines (ex, shortest distance between the two lines) to a second distance between the at least two lines (ex, longest distance between the two lines) based on the number of pixels regarding the plurality of lines and derive image projection distortion information about the surface of the object based on the calculated distance ratio.

For example, the image projection distortion information deriving unit 210 may derive image projection distortion information about some of the plurality of cubes included in the object by calculating a narrowing ratio of two straight line components relative to the size of the cubes.

The extracting unit 200 may derive viewing distance information and viewing angle information between the object and a user (a camera corresponding to a viewer looking at the object) from an image of the object and the user taken by the imaging device (not shown).

The image projection distortion information deriving unit 210 may calculate the number of pixels regarding the object from the image of the object, calculate a viewing distance between the object and a camera based on the number of pixels regarding the object, and derive image projection distortion information about the surface of the object based on the viewing distance information. Here, the image projection distortion information may include the magnification of image projection distortion depending on the positions of the object and the camera.

When the placement of the plurality of cubes included in the object changes, the image projection distortion information deriving unit 210 may derive image projection distortion information about the surface of the object based on viewing distance information and viewing angle information between the camera and the object whose placement has changed.

The image selecting unit 220 may select a content image to be projected on the surface of the object based on the surface shape of the object. For example, the image selecting unit 220 may select a content image suitable for the surface shape of the plurality of cubes included in the object from a database. Here, the database stores therein a plurality of content images mapped to the surfaces of a plurality of objects, respectively.

For example, the image selecting unit 220 may select a content image to be projected on the surface of the object based on the placement form of the plurality of cubes included in the object.

For example, if the surface of the object has a color, the image selecting unit 220 may select a content image with the complementary color of the surface color of the object as an image to be projected on the surface of the object.

For example, the image selecting unit 220 may select a content image selected from a user device (not shown) as an image to be projected on the surface of the object.

The projecting unit 230 may project a content image on the surface of the object based on the derived image projection distortion information.

For example, the projecting unit 230 may project a content image selected by the image selecting unit 220 on the surfaces of the plurality of cubes included in the object based on an image projection distortion ratio included in the derived image projection distortion information.

For example, when the placement of the plurality of cubes included in the object changes, the projecting unit 230 may project a content image on the surface of the object including the plurality of cubes whose placement has changed based on image projection distortion information derived depending on the changed placement of the object.

Meanwhile, it would be understood by a person with ordinary skill in the art that each of the extracting unit 200, the image projection distortion information deriving unit 210, the image selecting unit 220 and the projecting unit 230 can be implemented separately or in combination with one another.

Figure 4:
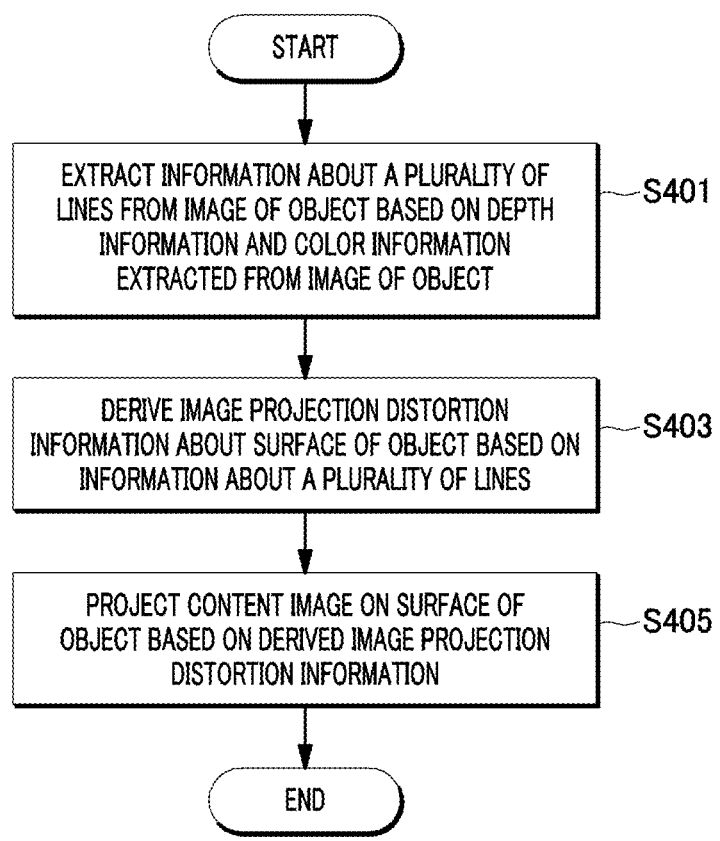
FIG. 4 is a flowchart showing a method for projecting an image on the surface of an object, in accordance with various embodiments described herein.

FIG. 4 is a flowchart showing a method for projecting an image on the surface of an object, in accordance with various embodiments described herein.

Referring to FIG. 4, in a process S401, the image projecting device 20 may extract information about a plurality of lines from an image of an object based on depth information and color information extracted from the image of the object.

In a process S403, the image projecting device 20 may derive image projection distortion information about the surface of the object based on the extracted information about a plurality of lines.

In a process S405, the image projecting device 20 may project a content image on the surface of the object based on the derived image projection distortion information.

In the descriptions above, the processes S401 to S405 may be divided into additional processes or combined into fewer processes depending on an exemplary embodiment. In addition, some of the processes may be omitted and the sequence of the processes may be changed if necessary.

Computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An image projecting device for projecting an image on a surface of an object, comprising:
    an extracting unit configured to extract information about a plurality of lines from an image of the object based on depth information and color information extracted from the image of the object;
    an image projection distortion information deriving unit configured to derive image projection distortion information about the surface of the object based on the information about the plurality of lines, by performing operations including:
        calculating a number of pixels regarding the plurality of lines,
        calculating a distance ratio of a first distance between at least two of the plurality of lines to a second distance between the at least two of the plurality of lines based on the number of pixels regarding the plurality of lines, and deriving image projection distortion information based on the calculated distance ratio; and a projecting unit configured to project a content image on the surface of the object based on the derived image projection distortion information.

2. The image projecting device of claim 1, wherein the image projection distortion information deriving unit is further configured to:

identify information of a direction in which a distance between at least two lines among the plurality of lines narrows, and derive the image projection distortion information based on the identified direction information.

3. The image projecting device of claim 1, wherein the image projection distortion information deriving unit is further configured to:

calculate a number of pixels regarding the object from the image of the object;

calculate a viewing distance between the object and a camera based on the number of pixels regarding the object; and derive the image projection distortion information based on the viewing distance.

4. The image projecting device of claim 1, further comprising:

an image selecting unit configured to select a content image to be projected on the surface of the object based on a surface shape of the object.

* * * * *